United States Patent
Celikel et al.

(10) Patent No.: US 11,480,461 B2
(45) Date of Patent: Oct. 25, 2022

(54) COMPACT SYSTEM AND METHOD FOR VIBRATION AND NOISE MAPPING

(71) Applicant: FORD OTOMOTIV SANAYI ANONIM SIRKETI, Istanbul (TR)

(72) Inventors: Selcuk Celikel, Istanbul (TR); Fethi Semih Ozkan, Istanbul (TR); Kazi N. Adil, Kocaeli (TR); Alper Tekeli, Istanbul (TR)

(73) Assignee: FORD OTOMOTIV SANAYI ANONIM SIRKETI, Istanbul (TR)

( * ) Notice: Subject to any disclaimer, the term of this patent is extended or adjusted under 35 U.S.C. 154(b) by 426 days.

(21) Appl. No.: 16/475,142

(22) PCT Filed: Dec. 27, 2017

(86) PCT No.: PCT/TR2017/050708
§ 371 (c)(1),
(2) Date: Jul. 1, 2019

(87) PCT Pub. No.: WO2018/125017
PCT Pub. Date: Jul. 5, 2018

(65) Prior Publication Data
US 2019/0331522 A1 Oct. 31, 2019

(30) Foreign Application Priority Data
Dec. 30, 2016 (TR) .................. 2016/20208

(51) Int. Cl.
*G01M 99/00* (2011.01)
*G01H 9/00* (2006.01)
(Continued)

(52) U.S. Cl.
CPC .............. *G01H 3/125* (2013.01); *G01H 5/00* (2013.01); *G01H 9/002* (2013.01); *G01M 1/22* (2013.01);
(Continued)

(58) Field of Classification Search
CPC .......... G01H 3/125; G01H 5/00; G01H 9/002; G01M 1/22; G01M 99/005; G01M 15/12;
(Continued)

(56) References Cited

U.S. PATENT DOCUMENTS

| | | | |
|---|---|---|---|
| 8,410,952 B2 * | 4/2013 | Abercrombie | G01M 5/0066 340/870.06 |
| 8,483,977 B1 * | 7/2013 | Johnnie | G01N 29/12 702/36 |

(Continued)

FOREIGN PATENT DOCUMENTS

| | | |
|---|---|---|
| DE | 102007023826 A1 | 11/2008 |
| FR | 2867563 A1 | 9/2005 |

(Continued)

OTHER PUBLICATIONS

Chen et al., Vibration of Permanent Magnet Brushless Machines Having a Fractional Number of Slots per Pole, 2006 IEEE International Magnetics Conference (INTERMAG), May 2006 (Year: 2006).*

(Continued)

*Primary Examiner* — Stephanie E Bloss
(74) *Attorney, Agent, or Firm* — Bayramoglu Law Offices LLC (57) ABSTRACT

A vibration measurement sensor (3) adapted to measure the vibrations formed on a test object (O) with moving mechanical systems, at least one noise measurement sensor (4) adapted to measure sound intensity and/or particle velocity and/or sound pressure in at least one direction, i.e. on one axis, and a vibration and noise mapping system (1) that is adapted to control the vibration measurement sensor (3) and the noise measurement sensor (4), to provide the vibration and acoustic performance data of the test object (O) according to the data obtained from these units (3, 4) and to identify the areas on the test object (O) that are problematic or need (Continued)

to be studied further in order to improve vibration and acoustic performances thereof, and to control the operation of test objects (O) such as moving mechanical systems under different conditions.

28 Claims, 2 Drawing Sheets

(51) Int. Cl.
*G01H 5/00* (2006.01)
*G01M 15/12* (2006.01)
*G01M 13/028* (2019.01)
*G01H 3/12* (2006.01)
*G01M 1/22* (2006.01)
*G06F 17/40* (2006.01)
*G06F 17/16* (2006.01)
*G05B 17/00* (2006.01)
*G06T 7/00* (2017.01)

(52) U.S. Cl.
CPC .......... *G01M 13/028* (2013.01); *G01M 15/12* (2013.01); *G01M 99/005* (2013.01); *G05B 17/00* (2013.01); *G06F 17/16* (2013.01); *G06F 17/40* (2013.01); *G06T 7/0002* (2013.01)

(58) Field of Classification Search
CPC ...... G01M 13/028; G05B 17/00; G06F 17/16; G06F 17/40; G06T 7/0002
See application file for complete search history.

(56) References Cited

U.S. PATENT DOCUMENTS

| 2004/0125378 | A1 |   | 7/2004 | Selbach et al. |
| 2008/0033703 | A1 | * | 2/2008 | Enomoto ................ G06F 30/23 703/7 |
| 2010/0011386 | A1 | * | 1/2010 | Fukasawa .......... G11B 5/59627 720/692 |
| 2010/0204965 | A1 | * | 8/2010 | Ide ......................... G06F 30/23 703/2 |
| 2011/0301929 | A1 | * | 12/2011 | Huang ................... G06F 30/23 702/56 |
| 2012/0188192 | A1 | * | 7/2012 | Sano ....................... G06F 3/011 345/173 |

FOREIGN PATENT DOCUMENTS

| TR | 2012/04772 |    | 2/2015 |
| WO | 99/35470   | A1 | 7/1999 |

OTHER PUBLICATIONS

Fazelzadeh et al., Vibration analysis of curved graphene ribbons based on an elastic shell model, Mechanics Research Communications, vol. 56, Mar. 2014, pp. 61-68 (Year: 2014).*

* cited by examiner

COMPACT SYSTEM AND METHOD FOR VIBRATION AND NOISE MAPPING

CROSS REFERENCE TO THE RELATED APPLICATIONS

This application is the national phase entry of International Application No. PCT/TR2017/050708, filed on Dec. 27, 2017, which claims priority from Turkish Patent Application 2016/20208, filed on Dec. 30, 2016, the entire contents of which are incorporated herein by reference.

TECHNICAL FIELD

The present invention relates to a compact system and method for vibration and noise mapping that facilitates the generation of vibration and noise maps of vibration and noise sources and rapid identification of areas which are desired to be improved and/or are problematic.

BACKGROUND

Dynamic mechanical systems, e.g. motors used in automotive vehicles or household appliances, vibrate and generate noise due to their moving parts. However, vibration and noise have both physiological and psychological effects and have a direct influence on human health. Therefore, recently vibration and acoustic performances of mechanical systems have become one of the most important parameters that influence customer satisfaction. The vibration and acoustic performances are measured in anechoic chambers and/or reverberation chambers.

The methods used to identify and solve problems in cases where vibration and acoustic performances fail to meet the target values are briefly explained below.

One method that is used to identify the problems is to mount multiple vibration sensors on the surfaces of moving mechanical systems and at the same time to use near-field microphones for multiple positions. In case the source of the vibration and noise cannot be identified in the determined positions, the measurements are repeated after manually moving the vibration sensors and microphones to different positions. The most important reason for the necessity of moving the sensors is the limited number of channels in the data acquisition systems. Every measurement that is repeated requires data collection and data processing for multiple days. Moreover, above explained measurement method is not able to determine the orientation vectors of vibration and noise.

Another method that is used to localize the noise source is measurement by an acoustic camera. The microphones of the acoustic cameras are placed in front of the moving mechanical systems and collect real-time data, while simultaneously; the collected data are processed onto the image taken by the camera using an algorithm. An acoustic map of the noise source is obtained as a result of the measurement. However, information on the vector orientation of noise cannot be obtained by this method.

Another method that is used to localize the noise source is the acoustic holography measurement method. In contrast with the acoustic camera method, only near-field acoustic measurements and acoustic measurements in echoic environments can be conducted and acoustic orientation vectors can be drawn by this method.

Another method that is used to localize the noise source is the sound intensity measurement method. In this method, data are collected from more than one location around the noise source. The measurement locations are marked manually on a software and these are connected to form a surface and a shell model is obtained. The sound intensity measurement results are analyzed and a noise map of only the shell model is obtained. With the present technology, it is necessary to place the sound intensity probe on a carrier unit (preferably an industrial robot) in order to be able to use this method in the tests of moving mechanical systems without needing manpower. Müller-BBM GmbH has a sound intensity measurement system integrated onto a robot arm. In addition, Microflown Technologies offers a special sound intensity measurement sensor (WO 99/35470 A1).

Another method that is used to determine the vibration level is the contactless vibration measurement method. This is the method that is used to measure the vibration emitted from a source by using at least one interferometer, without contacting with the source. It is possible to generate only a vibration map on the three-dimensional shell model by analyzing the data collected by the interferometer. Polytec GmbH has developed scanner type interferometers and integrated these onto the arm of an industrial robot, and has demonstrated that the method can be applied faster with the product, "RoboVib", which is already on the market. Polytec GmbH holds US patent no. 2004/125378 related with said measurement method.

However, it is not possible to determine by these measurements which mechanical system element is the source of the vibration and noise problems in a quick and practical manner.

Different equipment and methods are used to identify the orientation vectors of vibration and noise. However, these measurements can only be taken manually using the available technology, and therefore take a long time.

On the other hand, the present invention proposes a compact system and method for vibration and noise mapping whereby the noise and/or vibration problems of moving mechanical systems can be determined within a very short time, and these problems can be examined examine and reported in detail.

SUMMARY

The primary object of the present invention is to provide a system and method for vibration and noise mapping by integrating at least one contactless one-dimensional vibration measurement unit and at least one one-dimensional noise measurement unit on at least one moving arm or a Cartesian movement mechanism that can move at desired speeds, preferably on different axes and directions, and allowing all units to communicate with each other.

Another object of the present invention is to provide a system and method for vibration and noise mapping that allows the generation of vibration and acoustic shell models automatically and/or manually.

Another objective of the present invention is to provide a system and method for vibration and noise mapping that allows vibration and acoustic measurements to be made very quickly at the defined positions, automatically without needing manpower (preferably by a moving arm of a Cartesian movement mechanism).

Another objective of the present invention is to provide a system and method for vibration and noise mapping that allows vibration and acoustic mapping analyses of the test object to be conducted automatically.

Another objective of the present invention is to provide a system and method for vibration and noise mapping that allows the generation of vibration and acoustic shell models automatically.

Another objective of the present invention is to provide a system and method for vibration and noise mapping that imparts the ability to view, examine and analyze the vibration and acoustic maps together with the orientation vectors on the shell model, preferably separately or in a superimposed manner.

Another objective of the present invention is to provide a system and method for vibration and noise mapping that allows automatic reporting of measurement results.

BRIEF DESCRIPTION OF THE DRAWINGS

Accompanying drawings are given solely for the purpose of exemplifying a vibration and noise mapping system, whose advantages over prior art were outlined above and will be explained in brief hereinafter.

The drawings are not meant to delimit the scope of protection as identified in the Claims, nor should they be referred to alone in an effort to interpret the scope identified in said Claims without recourse to the technical disclosure in the description of the present invention.

DETAILED DESCRIPTION OF THE EMBODIMENTS

The numerals given below are referred to in the detailed description of the present invention.
System components:
1) Vibration and noise mapping system
2) Movement mechanism
3) Vibration measurement unit
4) Noise measurement unit
5) Data processing unit
O) Test object
Method steps:
100) Vibration and noise mapping method
110) Determining measurement positions
120) Taking vibration and acoustic measurements
130) Analyzing vibration and acoustic measurements
140) Generating and reporting vibration and acoustic maps
145) Identifying excitation points
150) Measuring frequency response functions The details of the system of the present invention that has been developed to determine the vibration and acoustic performances of moving mechanical systems in technical fields such as household appliances, automotive, defense, aircraft/spacecraft etc., and to identify the vibration and noise problems thereof much faster and automatically, and its operating principle are provided below.

Figure 1:
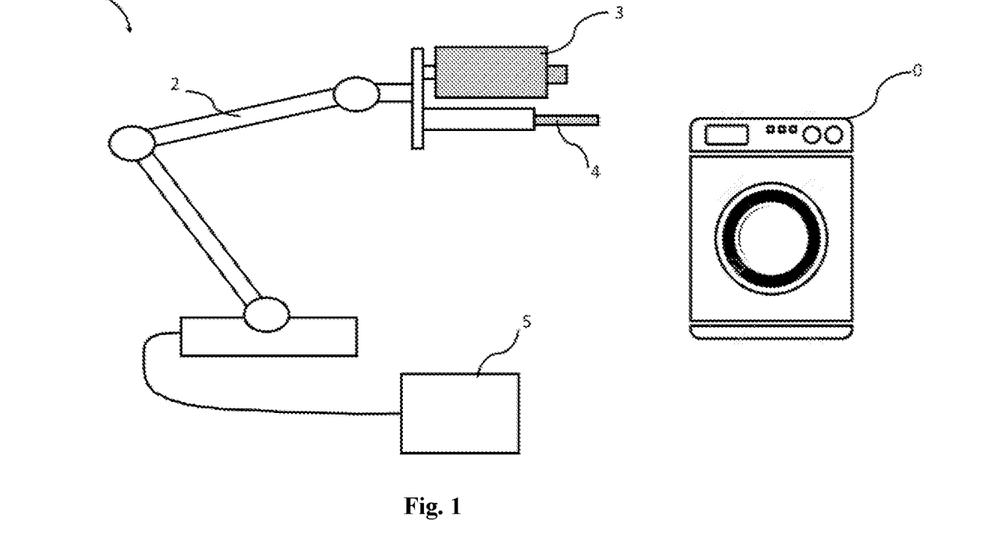
FIG. 1 demonstrates a schematic representation of the vibration and noise mapping system that is the subject of the present invention.

As can be seen in FIG. 1, a vibration and noise mapping system (1) is provided in order to ensure that vibration and acoustic maps of moving mechanical systems, which are the subject of the present invention, are generated and the areas, which are required to be studied in order to increase the vibration and acoustic performances thereof and/or which are problematic, are identified quickly and without contact.

Vibration and noise mapping system (1) of the invention comprises at least one movement mechanism (2) such as a moving arm or a Cartesian movement mechanism that is capable of moving at the required speeds on different axes and directions. At least one one-dimensional vibration measurement unit (3) and at least one noise measurement unit (4), which are contactless, are integrated onto the said movement mechanism (2), as will be explained below in detail.

A three-dimensional vibration measurement unit (laser) and geometry scanning unit used as the vibration measurement unit (3) developed by Polytec is commercially available under the name of "RoboVib" and is known in the prior art. Such laser based measurement systems, with multiple mirrors, allowing multiple measurements from a single point, lead to high cost increases in the products that they are integrated in.

On the other hand, the present invention provides a more basic measurement system in the form of a vibration measurement unit (3) that is capable of measuring in at least one direction under the control of the movement mechanism (2) in one round. In addition, said vibration measurement unit (3) enables an operating system that significantly contributes in the operating speed of the vibration and noise mapping system (1) and allows for coordination with a noise measurement unit (4). In other words, vibration and noise mapping system (1) of the present invention proposes a system that is much less complex and is also faster by taking vibration and acoustic measurements for a certain point consecutively. On the other hand, in case of a vibration measurement unit (3) with multiple mirrors that allows multiple measurements to be taken from a single point, operation of the vibration measurement unit as a separate unit that is independent of the vibration measurements both makes the processing of the obtained data sets more complicated and increase in the total processing time significantly.

On the other hand, said noise measurement unit (4) is activated and takes measurements immediately after said vibration measurement unit (3) completes taking measurements in at least one operating direction and each vibration and noise data set is advantageously collected consecutively in one round for a single point and matched in three-dimensional space.

It should be stated that said vibration measurement unit (3) explained above is not capable of acoustic measurement and acoustic mapping and its function is limited to vibration measurement. On the other hand, as stated above, the movement mechanism (2) of vibration and noise mapping system (1) the present invention comprises a noise measurement unit (4) that is at least one-dimensional, in addition to the said vibration measurement unit (3).

In a preferred embodiment of the invention, said at least one-dimensional vibration measurement unit (3) functions as a laser vibration meter and in general, functions as a vibration measurement unit which is integrated with the movement mechanism (2).

In a preferred embodiment of the invention, said at least one-dimensional noise measurement unit (4) functions as a sound intensity-particle velocity-sound pressure measurement unit, and in general functions as a noise measurement unit which is integrated with the movement mechanism (2).

The vibration and noise measurement system (1), which is composed of all aforementioned units and the moving arm or Cartesian movement system on which these units will be mounted, can be referred to as "robot". Said robot is capable of taking vibration measurements only, acoustic measurements only or both vibration and acoustic measurements, depending on user demand. According to the present invention, data regarding the appropriate measurement positions are transferred to the robot prior to starting data collection. The measurement positions may be input to the robot manually one by one, or in a preferred embodiment of the invention, they may also be determined automatically.

In a preferred embodiment of the invention, the three-dimensional CAD model of the test object (O), for which vibration and noise mapping will be done, is provided to vibration and noise mapping system (1) as a ready data set and the positions where the robot will make measurements are optimized and the appropriate measurement positions are calculated automatically. While the CAD model may be generated in the computer media, it may also be obtained by using the external scanner unit.

Figure 2:
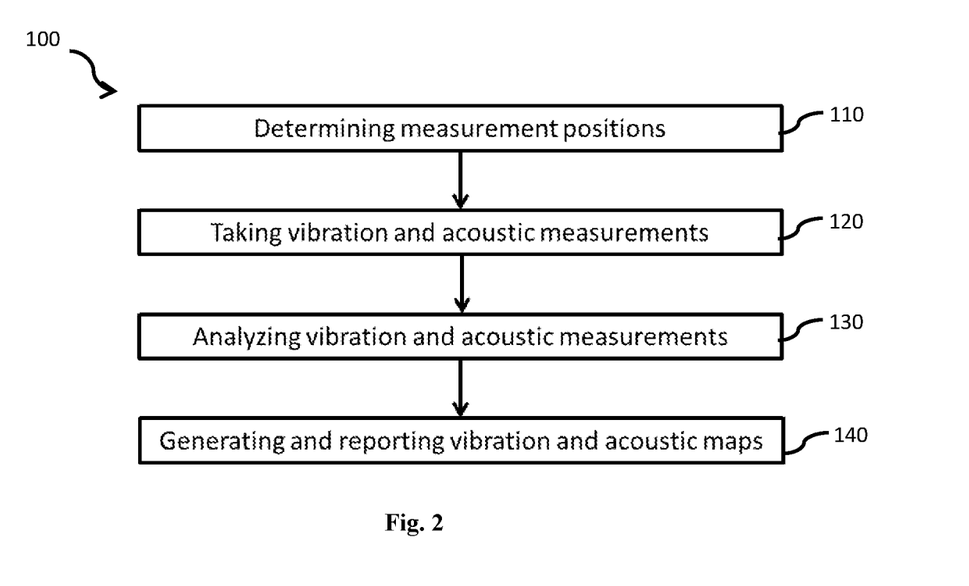
FIG. 2 demonstrates a schematic representation of the vibration and noise mapping method that is the subject of the present invention.

The present invention additionally proposes a vibration and noise mapping method (100) comprising the steps of determining measurement positions (110), taking vibration and acoustic measurements (120), analyzing vibration and acoustic measurements (130), identifying excitation points (145), measuring frequency response functions (150), and generating and reporting vibration and noise maps (140).

The steps of the determining of measurement positions (110) function are outlined below: According to the present invention, the three-dimensional CAD model containing the surface that will be measured and any obstacles before it (cables, hoses, etc.) is loaded into said vibration and noise mapping system (1) in order to be processed. Said vibration and noise mapping system (1) optimizes and determines the measurement locations and robot positions, by taking the obstacles into account, in order to enable the measurement of the maximum surface area. These functions may be realized in an external software environment and transferred to the electronic control unit of the system directly as a data set to be processed. Said optimization function is an application that has been disclosed to the general public and is described in the patent publication numbered TR 2012/04772 as an example.

The measurement and mapping function of said vibration and noise mapping system (1) operates according to the following basic steps. First, the laser vibrometer (vibration measurement unit (3)) within said vibration and noise mapping system (1) measures the distance (displacement) between the test object (O). The coordinate data of the vibration measurement sensor is recorded by the vibration and noise mapping system (1) electronic control unit according to the pre-defined reference point and reference axis. Since the displacement between the laser vibration sensor and the test object (O) is known, the position of the measurement point is calculated and this process is repeated for all measurement points.

As explained above, after the coordinates of the measurement point are determined consecutively by said vibration measurement unit (3), said measurement points are connected to generate a vibration shell model. Since the vibration shell model is generated from the data obtained from test object (O), it is compared with the CAD model and, if necessary, new measurement points are determined automatically for the missing surfaces and it is ensured that the robot starts to make measurements once more. This is continued until the shell model is completed.

On the other hand, the coordinates of the end point of said noise measurement unit (4) sensor is known with reference to the coordinates of the end point of the vibration sensor. Noise measurement points are generated based on the known vibration measurement positions. Similarly, an acoustic shell model is generated by connecting the measurement points.

The features of the measurement function of vibration and noise mapping system (1) according to the present invention is explained below. The taking vibration and acoustic measurements (120) function is carried out as follows:

The desired minimum and maximum frequency values for measurements are selected and at the same time, the frequency resolution of the measurement is selected.

The number of measurements that will be used to get an average according to the quality of the measurements and the number of measurements that will be taken at each measurement point are determined. The total measurement duration is calculated by taking into account the total number of measurement points, frequency range, frequency resolution, average number and measurement conditions, and is displayed on the control unit screen.

The measurement types and analyses that will be made may include analysis groups such as time based measurement record, octave analysis, spectrum analysis (taking Phased FFT), autopower analysis (FFT without phase information), sound intensity analysis, acoustic power analysis, and others known to the person skilled in the art. The window type that will be applied to interpreting the collected data is selected separately (Windowing: Hanning, Hamming, etc.).

After the aforementioned measurement specifications are assigned, the robot goes to the positions defined for measurement and carries out the vibration and acoustic measurement at pre-defined conditions. The quality of the measurement point and the measurement is determined by checking the collected data against the average values. While test object (O) is at steady state condition dynamically (for example, operation of an internal combustion engine at constant crankshaft speed), the robot goes to the measurement locations and takes the vibration and noise measurements simultaneously. When the measurements at all locations are completed, vibration and noise mapping system (1) electronic control unit sends the "stop" command and the robot returns to the initial measurement position.

Then, said test object (O) is operated in the next steady state condition (for example, increasing the crankshaft speed of an internal combustion engine from 1000 rpm to 1500 rpm and keeping it constant at this position) and the vibration and acoustic measurement are taken again. This is continued until the vibration and acoustic measurements at all desired conditions and all locations are completed.

The vibration values at all measurement conditions are examined by analyzing the shell models generated from the vibration and acoustic measurement results and the areas where vibration is concentrated are determined automatically. The step of analyzing the vibration and acoustic measurement (130) is described below.

Accordingly, the areas where sound intensity-particle velocity-sound pressure amplitudes are highest at all conditions are determined automatically and are recorded in the memory together with the total sound intensity value at these positions. If required, the amplitudes in the areas where noise level is highest can be reduced to zero by the software or reduced to a value determined by the user and the change in total sound intensity value can be calculated.

Preferably, the vibration and noise mapping system (1) software or an external software processing the data generated from measurements taken by said vibration and noise mapping system (1) can calculate the sound pressure values at the free field microphones placed a predetermined distance away from said test object (O), using the sound power values at the measurement positions. The software can also calculate the sound intensity values at the free field microphones positioned virtually at a predetermined distance, by using the total sound power value calculated when the amplitudes at the areas with the highest noise level are reduced to zero.

The software prepares the vibration and noise map report for the test object (O) automatically. The vibration and noise maps generation and reporting (140) function is described below: The vibration amplitudes at a certain frequency and vectorial vibration orientations in at least one direction positioned on the vibration shell model are calculated and drawn for each measurement point using the automatic reporting feature. Similarly, sound intensity-particle velocity-sound pressure amplitudes in at least one direction at a certain frequency and the vectorial acoustic orientations positioned on the acoustic shell model for each measurement point are calculated and drawn.

In this way, it can be ensured that the vibration and acoustic orientations positioned on the shell models for each measurement point and their amplitudes can be drawn simultaneously or separately. It is possible that the vibration and noise maps for the test object (O) are generated automatically or manually, reported and sent to the related parties in a pre-determined format (for example, by e-mail) optionally, together with all the aforementioned results.

Figure 3:
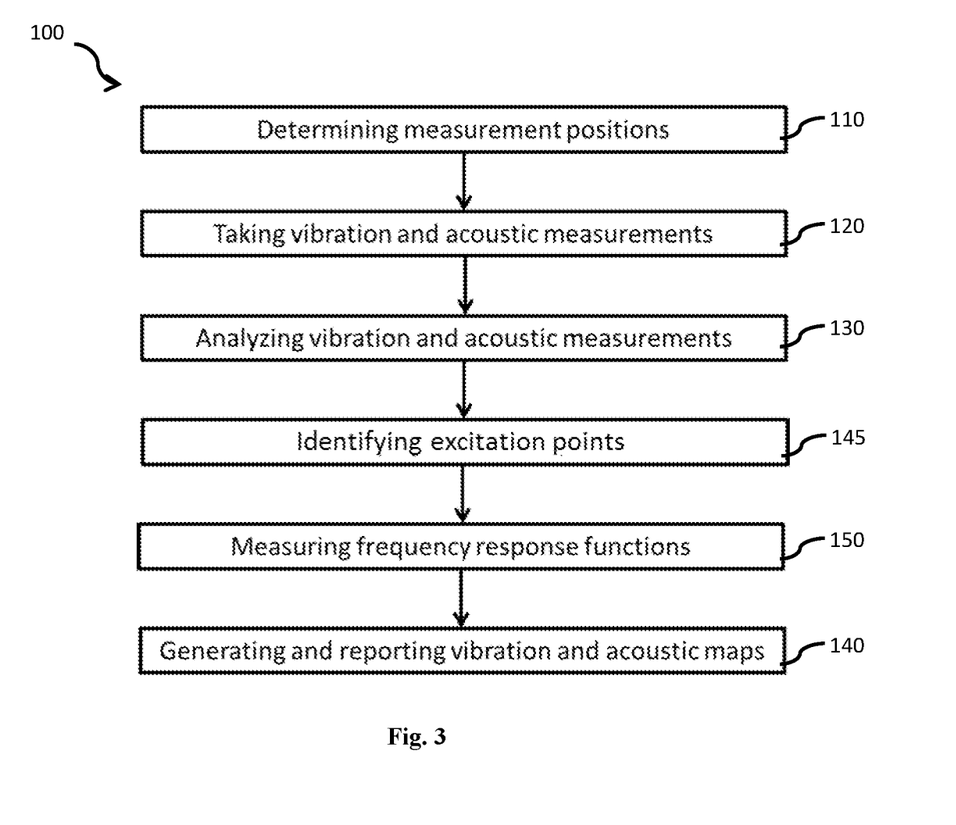
FIG. 3 demonstrates a schematic representation of another application of the vibration and noise mapping system that is the subject of the present invention.

In a preferred embodiment of the present invention, a contactless acoustic excitation unit is integrated in addition to the available units, on at least one moving arm or Cartesian movement mechanism (2), which can move in different axes and directions at desired speeds, and thus the vibration and noise mapping system (1) of the present invention is capable of also measuring the frequency response functions of the test object (O).

According to this embodiment, the measurements of the frequency response functions (150) are taken as follows: The areas on the test object (O) where high vibration and high noise amplitudes are formed simultaneously are determined by the electronic control unit of vibration and noise mapping system (1). The optimum excitation points are identified (145) based on the vibration amplitudes at the determined areas and communicated to the robot. The frequency range where measurements are required to be taken and the frequency resolution of the measurements are determined. The average number taken during vibration measurements is also used here.

After the necessary measurement period is calculated for the desired frequency range and measurement resolution, the robot goes to the determined positions and stimulates the structure in these areas with the acoustic excitation unit in a contactless manner. Said vibration measurement unit (3) and said noise measurement unit (4) collect data simultaneously. The "frequency response functions" are calculated following measurement. The measurements are taken until data is collected from all excitation points. After the measurement taking is complete, the obtained frequency response functions are analyzed and the natural frequencies are calculated for the structure and mode shapes are drawn.

In another preferred embodiment of the present invention, a geometric scanner unit is integrated on the at least one moving arm or Cartesian movement mechanism (2) that can move on different axes and directions, at desired speeds, in addition to the available units (vibration measurement unit (3) and noise measurement unit (4)), and the system is capable of scanning the surfaces of test object (O) that will be measured and generating the three-dimensional vibration shell model automatically. In addition to the geometric scanner unit that is offered by this embodiment, an acoustic excitation unit may also be integrated optionally, according to the embodiment described above.

According to another preferred embodiment of the present invention, an alternative method is developed for determining the measurement points (110) step of the method by adding at least one visual element (illuminated panel, illuminated sphere, etc.) that allows for the position of the movement mechanism (2) in at least one dimension to be tracked by an external camera.

Under circumstances where simple Cartesian movement mechanisms are used in the system together with this alternative method, the spatial positions of the units cannot be known since a reference point and a reference axis cannot be defined. In order to find a solution to this problem, this method is applied as described below:

At least one camera is positioned across the measurement surface so that the complete surface can be monitored. The camera takes a photograph of the measurement surface. After the photograph is taken, the simple Cartesian movement mechanism is positioned. A "visual object" is placed on the vibration sensor. This object may be a LED bulb, an infrared light provider, an illuminated panel, an illuminated sphere, etc. The sensors are moved to the appropriate positions using the simple Cartesian movement mechanism. When the command to go into the measurement position is given to the system, the image is processed and the position of the illuminated visual object is determined by the camera and is recorded to the memory as the measurement point on the first photograph. This is repeated for all measurement points and a vibration shell model is generated by connecting the measurement points. The coordinates of the noise measurement sensor end point is known with reference to the coordinates of the vibration sensor end point. Noise measurement points are generated based on the known vibration measurement positions. An acoustic shell model is generated by connecting the measurement points.

In summary, the present invention is related to at least one vibration measurement sensor (3) adapted to measure the vibrations formed on a test object (O) with moving mechanical systems, at least one noise measurement sensor (4) adapted to measure sound intensity, particle velocity, sound pressure in at least one direction, i.e. on one axis, and a vibration and noise mapping system (1) that is adapted to control the vibration measurement sensor (3) and the noise measurement sensor (4), to provide the vibration and acoustic performance data of the test object (O) according to the data obtained from these units (3, 4) and to identify the areas on the test object (O) that are problematic or required to be studied further in order to improve the vibration and acoustic performance, and to control the operation of test objects (O) such as moving mechanical systems under different conditions. The electronic control unit of said vibration and noise mapping system (1) is electrically connected to at least one internal data processing unit (5), and said data processing unit (5) may also be realized as an external unit. In other words, according to a preferred embodiment of the invention, the data processing unit (5) is a separate hardware that has a high processor power and is suitable to carry out sophisticated data processing functions, and operates as connected with the electronic control unit. Again, according to a preferred application, the data processor unit (5) may process the raw data according to the measurement results, as an external hardware.

In a nutshell, the present invention proposes a vibration and noise mapping system (1) for the generation of vibration and noise maps of vibration and noise sources and rapid identification of areas, which are desired to be improved and/or are problematic, comprising at least one movement mechanism (2) that is movable on different axes and directions at desired speeds, at least one vibration measurement unit (2) that is movable together with said movement mechanism (2), and is adapted to measure the vibration of a test object (O) in at least one direction, and at least one noise measurement unit (4) that is movable together with said movement mechanism (2) and is adapted to measure sound intensity and/or particle velocity and/or sound pressure in at least one direction on said test object (O).

In one variation of the present invention, said vibration and noise mapping system (1) comprises an electronic control unit whereby the control of said vibration and noise mapping system (1) in order to match at least one vibration data measured by said vibration unit (3) at a location to at least one noise data measured by said noise measurement unit (4) at the same location and collect matching vibration and noise data corresponding to multiple locations is facilitated.

In a further variation of the present invention, said vibration and noise mapping system (1) comprises at least one contactless acoustic excitation unit that is movable together with said movement mechanism (2) for ensuring that preferred points on the test object (O) are excited without contact.

In a still further variation of the present invention, said vibration and noise mapping system (1) comprises an electronic control unit whereby the measurement of the distance between said vibration measurement unit (3) and said test object (O) prior to each vibration measurement for each location, and recording of coordinate data of said vibration measurement unit (3) based on a predetermined reference point and a reference axis is facilitated.

In a yet still further variation of the present invention, said vibration and noise mapping system (1) comprises an electronic control unit whereby the generation of a vibration shell model by connecting coordinates of vibration measurements taken by said vibration measurement unit (3) is facilitated.

In a yet still further variation of the present invention, said vibration and noise mapping system (1) comprises an electronic control unit whereby the comparison of the generated vibration shell model against a computer-aided design model of said test object (O) in order to determine new measurement points for missing surfaces and taking vibration measurements thereon is facilitated.

In a yet still further variation of the present invention, said vibration and noise mapping system (1) comprises an electronic control unit whereby the calculation of the measurement coordinates of the noise measurement unit (4) based on the measurement coordinates of the vibration measurement unit (3) and the generation of an acoustic shell model by connecting said measurement points are facilitated.

In a yet still further variation of the present invention, said vibration and noise mapping system (1) comprises a vibration measurement unit (3) and noise measurement unit (4) whereby taking of measurements of said test object (O) in more than one dynamic steady state condition is facilitated.

In a yet still further variation of the present invention, said vibration and noise mapping system (1) comprises a vibration measurement unit (3) adapted to make frequency response function measurements for said test object (O).

In a yet still further variation of the present invention, said vibration and noise mapping system (1) comprises an electronic control unit whereby the calculation of the vibration amplitudes at certain frequency and vectorial vibration orientations in at least one direction for each measurement point positioned on the vibration shell model, and/or sound intensity-particle velocity-sound pressure amplitudes at certain frequency and vectorial acoustic orientations in at least one direction for each measurement point positioned on the acoustic shell model is facilitated.

In a yet still further variation of the present invention, said vibration and noise mapping system (1) comprises a contactless acoustic excitation unit whereby the acoustic and contactless excitation of the excitation points, which are determined based on the vibration amplitudes in the areas where high vibration and high noise amplitudes are formed simultaneously on said test object (O), is facilitated.

In a yet still further variation of the present invention, said vibration and noise mapping system (1) comprises at least one visual element for ensuring that the position of said movement mechanism (2) is tracked in at least one direction and an external camera for tracking said visual element.

In a yet still further variation of the present invention, said visual element is a light source.

In a yet still further variation of the present invention, said vibration and noise mapping system (1) comprises a camera for ensuring that the position of said visual element is determined based on the image detected by said camera, through image processing of the photograph of the measurement surface taken by said camera, which is placed across the measurement surface in a way to see the complete surface, and visual element placed in front of the said vibration measurement unit (3).

In a yet still further variation of the present invention, said vibration and noise mapping system (1) comprises a memory whereby recording of said position of said visual element, which is determined by image processing, as a measurement point on the first photograph is facilitated.

In a yet still further variation of the present invention, said vibration and noise mapping system (1) comprises an electronic control unit that has been adapted to control the operation of movement mechanism (2), vibration measurement unit (3), noise measurement unit (4) and acoustic excitation unit.

In a yet still further variation of the present invention, said vibration and noise mapping system (1) comprises an electronic control unit whereby moving of the movement mechanism (2) in a certain direction and axis, close to or away from said test object (O) and certain parts of said test object (O) during the test process is facilitated.

In a yet still further variation of the present invention, said vibration and noise mapping system (1) comprises an electronic control unit adapted to operate said noise measurement unit (4) for sound intensity, sound pressure and particle velocity measurement in order to start the measurements and take said noise measurement unit (4) to the new preferred position by operating said movement mechanism (2) according to the measurement values.

In a yet still further variation of the present invention, said vibration and noise mapping system (1) comprises an electronic control unit adapted to consecutively operate said vibration measurement unit (3) and said noise measurement unit (4) and control acoustic excitation unit to take frequency response function measurements for said test object (O).

In a yet still further variation of the present invention, said at least one dimensional vibration measurement unit (3) is a laser vibration measurement unit (3) and said noise measurement unit (4) is a sound intensity, particle velocity and sound pressure measurement unit.

In a yet still further variation, present invention proposes a vibration and noise mapping method (100) for the generation of vibration and noise maps of vibration and noise sources and rapid identification of areas, which are desired to be improved and/or are problematic using a vibration and noise mapping system (1) according to any preceding Claim, comprising the steps of:
- determining measurement positions (110),
- taking vibration and acoustic measurements (120),
- analyzing vibration and acoustic measurements (130),
- identifying excitation points (145),
- measuring frequency response functions (150), and
- generating and reporting vibration and noise maps (140).

In a yet still further variation of the present invention, said determining measurement positions (110) step further comprises the steps of optimizing the vibration measurement locations by taking the obstacles into account and determining the positions where measurements will be made by an electronic control unit, as per initial data set, so as to enable the measurement of a maximum surface area on a test object (O).

In a yet still further variation of the present invention, said determining measurement positions (110) step further comprises the step of electronic control unit comparing the vibration shell model with the three-dimensional computer-aided design model that is loaded externally and determining new measurement points for the missing surfaces, and taking measurements again by operating movement mechanism (2).

In a yet still further variation of the present invention, said determining measurement positions (110) step further comprises the step of electronic control unit moving the movement mechanism (2) to the points to be measured one by one and recording the position data in the memory of said electronic control unit.

In a yet still further variation of the present invention, said taking vibration and acoustic measurements (120) step further comprises the steps of movement mechanism (2) moving to the measurement locations, vibration measurement unit (3) taking vibration measurements and noise measurement unit (4) taking acoustic measurements.

In a yet still further variation of the present invention, said analyzing the vibration and acoustic measurements (130) step further comprises the step of the electronic control unit determining the areas where there is intensive vibration by analyzing the vibration and acoustic measurement results and the vibration values of the shell models at all pre-defined, different measurement conditions.

In a yet still further variation of the present invention, said analyzing the vibration and acoustic measurements (130) step further comprises the steps of the electronic control unit analyzing of the areas where sound intensity, particle velocity and sound pressure amplitudes in at least one direction are the highest in all pre-defined measurement conditions and recording together with the total sound power value in that condition.

In a yet still further variation of the present invention, said analyzing the vibration and acoustic measurements (130) step further comprises the steps of the electronic control unit reducing of the amplitudes to zero at areas where the highest level of noise is created and calculating the change in total sound power value.

In a yet still further variation of the present invention, said analyzing the vibration and acoustic measurements (130) step further comprises the step of the electronic control unit calculating the sound pressure values on the free-field microphones that are virtually positioned at a certain distance to the test object (O) using of the sound power values at the measurement points.

In a yet still further variation of the present invention, said identifying the excitation points (145) step further comprises the steps of the electronic control unit determining the areas where high vibration and noise amplitudes are formed simultaneously on the test object (O) and a contactless acoustic excitation unit exciting said areas in a contactless manner.

In a yet still further variation of the present invention, said measuring the frequency response functions (150) further comprises the step of vibration measurement unit (3) taking measurements in the areas that are excited by a contactless acoustic excitation unit, measuring the frequency response functions.

In a yet still further variation of the present invention, said measuring the frequency response functions (150) further comprises the step of electronic control unit analyzing the obtained frequency response functions, calculating the natural frequencies for the test object (O), and drawing the mode shapes.

In a yet still further variation of the present invention, said generating and reporting vibration and noise maps (140) step further comprises the step of electronic control unit generating the mode shapes of said test object (O).

In a yet still further variation of the present invention, said generating and reporting vibration and noise maps (140) step further comprises the steps of electronic control unit analyzing the test data, calculating and drawing the vibration amplitudes in the frequency range where measurements have been made and the vectorial vibration orientations in at least one direction on the vibration shell model for each measurement point.

In a yet still further variation of the present invention, said generating and reporting vibration and noise maps (140) step further comprises the steps of electronic control unit analyzing the test data, and calculating and drawing the sound intensity, particle velocity, sound pressure amplitudes in at least one direction in the frequency range where measurements have been made and the vectorial acoustic orientations in at least one direction positioned on the acoustic shell model for each measurement point.

In a yet still further variation of the present invention, said generating and reporting vibration and noise maps (140) step further comprises the step of electronic control unit drawing the vibration and acoustic orientations positioned for each measurement point on the shell models and the amplitudes thereof concurrently or separately.

What is claimed is:

1. A vibration and noise mapping system for generation of vibration and noise maps of vibration and noise sources and identification of areas, comprising:
   at least one movement mechanism movable on different axes and directions at desired speeds,
   at least one vibration measurement unit movable together with said movement mechanism is configured to measure the vibration of a test object in at least one direction,
   at least one noise measurement unit movable together with said movement mechanism is configured to measure a sound intensity, a particle velocity and a sound pressure in at least one direction on said test object;
   an electronic control to control the vibration and noise mapping system to match at least one vibration data measured by said vibration unit at a location to at least one noise data measured by said noise measurement unit at the location and collect matching vibration and noise data corresponding to a plurality of locations;

wherein, the electronic control generates a vibration shell model by connecting coordinate data taken by said vibration measurement unit;

wherein the electronic control obtains a measurement of a distance between said vibration measurement unit and said test object prior to each vibration measurement for each location, and records coordinate data of said vibration measurement unit based on a predetermined reference point and a reference axis; and wherein the electronic control compares the generated vibration shell model against a computer-aided design model of said test object in order to determine new measurement points for missing surfaces and taking vibration measurements thereon.

2. The vibration and noise mapping system according to claim 1, further comprising at least one contactless acoustic excitation movable together with said movement mechanism for ensuring contactless excitation of points on the test object.

3. The vibration and noise mapping system according to claim 2, wherein, the electronic control is configured to control an operation of the movement mechanism, the vibration measurement unit, the noise measurement unit and the acoustic excitation unit.

4. The vibration and noise mapping system according to claim 2, wherein, the electronic control is configured to operate said vibration measurement unit and said noise measurement unit and control the acoustic excitation unit and take frequency response function measurements for said test object.

5. The vibration and noise mapping system according to claim 1, wherein, the vibration measurement unit and the noise measurement unit take measurements of said test object in more than one dynamic steady state condition.

6. The vibration and noise mapping system according to claim 1, wherein, the vibration measurement unit is configured to make frequency response function measurements for said test object.

7. The vibration and noise mapping system according to claim 1, wherein, the acoustic and contactless excitation of the preferred points are determined based on the vibration amplitudes in areas where vibration and noise amplitudes are formed simultaneously on said test object.

8. The vibration and noise mapping system according to claim 1, further comprising at least one visual element for ensuring that a position of said movement mechanism is tracked in at least one direction and an external camera for tracking said visual element.

9. The vibration and noise mapping system according to claim 8, wherein, the visual element is a light source.

10. The vibration and noise mapping system according to claim 8, wherein, the external camera determines a position of said visual element based on an image detected by said external camera, through image processing of the image of a measurement surface taken by said external camera placed across the measurement surface in a way to see a complete surface, and the visual element placed in front of the vibration measurement unit.

11. The vibration and noise mapping system according to claim 10, further comprising a memory for recording of said position of said visual element, determined by the image processing, as a measurement point on a first photograph.

12. The vibration and noise mapping system according to claim 1, wherein, the electronic control moves the movement mechanism in a predetermined direction and axis, towards or away from said test object during a test process.

13. The vibration and noise mapping system according to claim 1, wherein, the electronic control is configured to operate said noise measurement unit for sound intensity, sound pressure and particle velocity measurement in order to start the measurements and take said noise measurement unit to a new preferred position by operating said movement mechanism according to the measurement values.

14. A vibration and noise mapping method for generation of vibration and noise maps of vibration and noise sources and identification of areas, using the vibration and noise mapping system according to claim 1, comprising the steps of:
  determining measurement positions,
  taking vibration and acoustic measurements,
  analyzing vibration and acoustic measurements,
  identifying excitation points,
  measuring frequency response functions, and
  generating and reporting vibration and noise maps.

15. The vibration and noise mapping method according to claim 14, wherein, the determining measurement positions step further comprises the steps of optimizing the locations by taking the obstacles into account and determining the positions where measurements will be made by the electronic control so as to enable the measurement of a maximum surface area on the test object.

16. The vibration and noise mapping method according to claim 15, wherein, the step of determining measurement positions further comprises a step of the electronic control comparing the vibration shell model with a three-dimensional computer-aided design model that is loaded externally and determining new measurement points for missing surfaces, and taking measurements again by operating movement mechanism.

17. The vibration and noise mapping method according to claim 15, the step of determining measurement positions further comprises a step of the electronic control moving the movement mechanism points to be measured one by one and recording a position data in a memory of the electronic control.

18. The vibration and noise mapping method according to claim 14, wherein, the step of taking vibration and acoustic measurements further comprises steps of movement mechanism moving to the locations, vibration measurement unit taking vibration measurements and subsequently noise measurement unit taking acoustic measurements.

19. The vibration and noise mapping method according to claim 14, wherein, the step of analyzing the vibration and acoustic measurements further comprises a step of the electronic control unit determining areas where there is vibration by analyzing the vibration and acoustic measurement results and vibration values of the vibration shell models at all pre-defined, different measurement conditions.

20. The vibration and noise mapping method according to claim 14, wherein, the step of analyzing the vibration and acoustic measurements further comprises steps of the electronic control analyzing of the areas where sound intensity, particle velocity and sound pressure amplitudes in at least one direction are highest in all pre-defined measurement conditions and recording together with a total sound power value in that condition.

21. The vibration and noise mapping method according to claim 14, wherein, the step of analyzing the vibration and acoustic measurements further comprises a step of the electronic control calculating the sound pressure values on the free-field microphones positioned at a certain distance to the test object, wherein the calculating the sound pressure values on the free-field microphones uses sound power values at the measurement points.

22. The vibration and noise mapping method according to claim 14, the step of identifying the excitation points further comprises steps of the electronic control determining areas where vibration and noise amplitudes are formed simultaneously on the test object and a contactless acoustic excitation exciting said areas in a contactless manner.

23. The vibration and noise mapping method according to claim 14, wherein, the step of measuring the frequency response functions further comprises a step of vibration measurement unit taking measurements in the areas that are excited by a contactless acoustic excitation, measuring the frequency response functions.

24. The vibration and noise mapping method according to claim 14, the step of measuring the frequency response functions further comprises a step of the electronic control analyzing obtained frequency response functions, calculating natural frequencies for the test object, and drawing mode shapes.

25. The vibration and noise mapping method according to claim 14, wherein, the step of generating and reporting vibration and noise maps further comprises a step of electronic control generating mode shapes of said test object.

26. The vibration and noise mapping method according to claim 25, wherein, the step of generating and reporting vibration and noise maps further comprises steps of the electronic control analyzing test data, calculating and drawing the vibration amplitudes in a frequency range where measurements have been made and a vectorial vibration orientations in at least one direction on the vibration shell model for each measurement point.

27. The vibration and noise mapping method according to claim 25, wherein, the step of generating and reporting vibration and noise maps further comprises steps of the electronic control unit analyzing test data, and calculating and drawing the sound intensity, particle velocity, sound pressure amplitudes in at least one direction in a frequency range where measurements have been made and a vectorial acoustic orientations in at least one direction positioned on an acoustic shell model for each measurement point.

28. The vibration and noise mapping method according to claim 25, wherein, the step of generating and reporting vibration and noise maps further comprises a step of the electronic control drawing vibration and acoustic orientations positioned for each measurement point on shell models and the amplitudes thereof concurrently or separately.

* * * * *